July 27, 1954  W. F. KLEIN  2,684,619
WEED, DEBRIS, AND LITTER SURFACING DEVICE
FOR GROUND WORKING IMPLEMENTS
Filed May 1, 1950  2 Sheets-Sheet 1
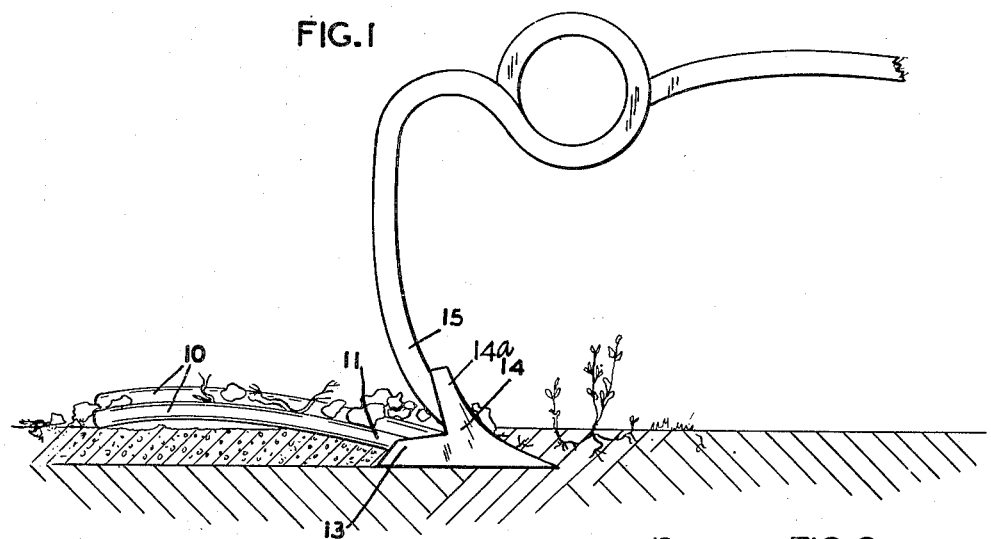
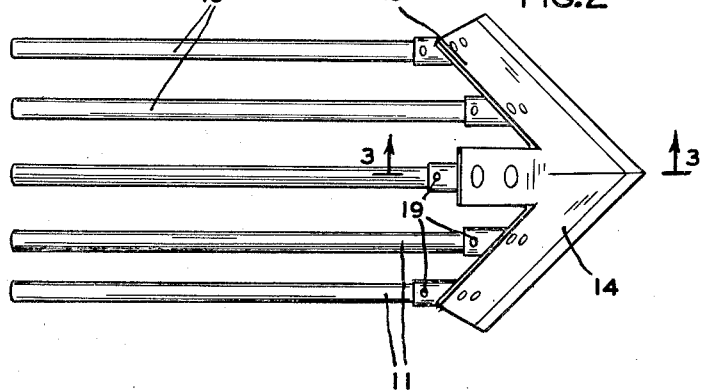
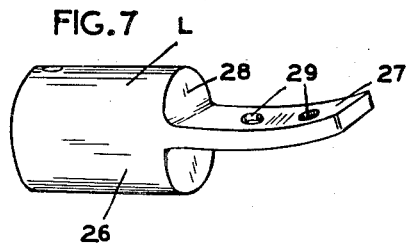
INVENTOR
WILLIAM F. KLEIN
BY
*Williamson & Williamson*
ATTORNEYS July 27, 1954
W. F. KLEIN
2,684,619
WEED, DEBRIS, AND LITTER SURFACING DEVICE
FOR GROUND WORKING IMPLEMENTS
Filed May 1, 1950
2 Sheets-Sheet 2
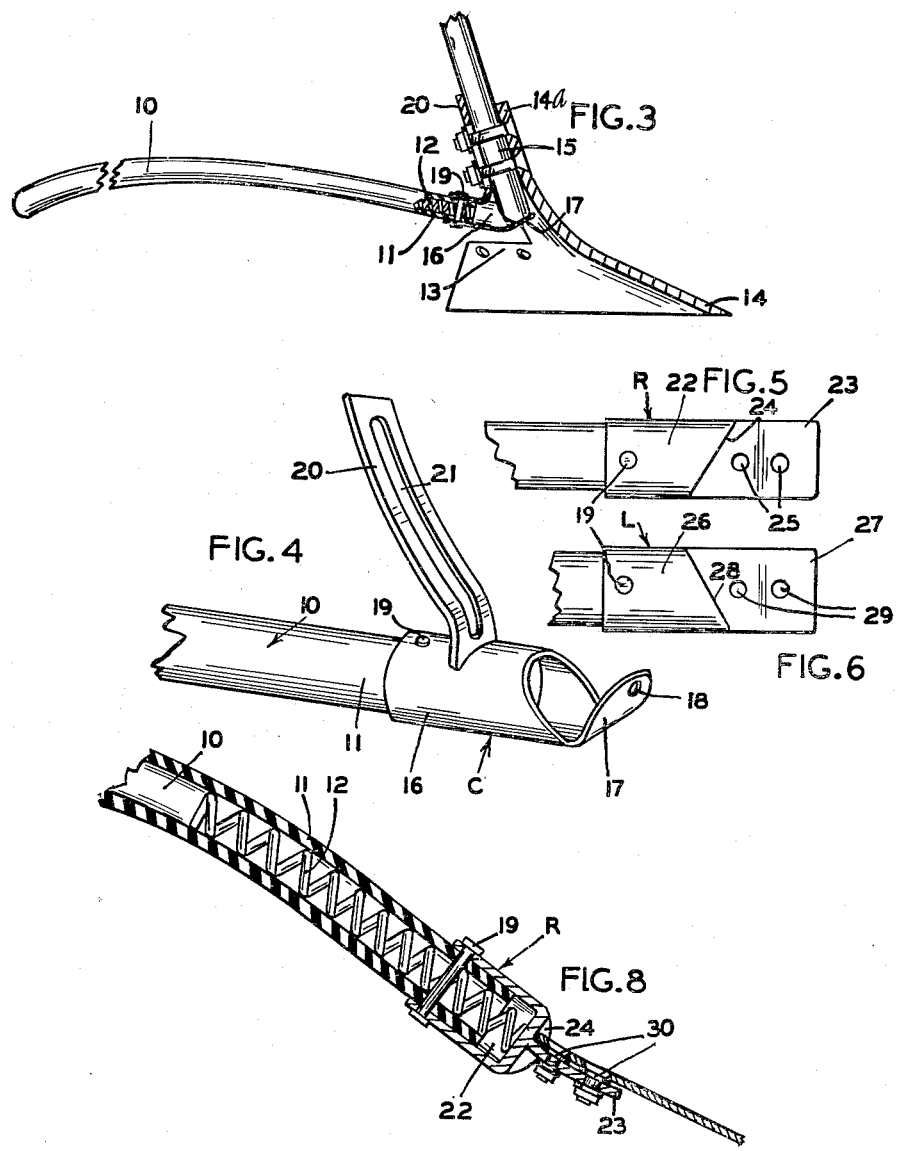
INVENTOR
WILLIAM F. KLEIN
BY
*Williamson & Williamson*
ATTORNEYS

Patented July 27, 1954

2,684,619

UNITED STATES PATENT OFFICE 2,684,619

WEED, DEBRIS, AND LITTER SURFACING DEVICE FOR GROUND WORKING IMPLEMENTS

William F. Klein, Warroad, Minn., assignor of one-fourth to E. W. Huschka, Warroad, Minn.

Application May 1, 1950, Serial No. 159,189

4 Claims. (Cl. 97—201)

This invention relates to weed, debris and litter surfacing devices for ground working implements.

Scientific studies have shown that the most effective cultivation is accomplished if the weeds, debris and litter found on the ground can in some way be deposited upon the earth surface where the sun's rays can strike the same for prolonged periods, and where the other elements of nature can act thereupon. The most effective and cheapest control measure for such insects as the Sawfly, Corn Borer and Boll Weevil has been proved to be the exposing of the weeds and crop residue which harbor hibernating insect larvae to the sunlight for prolonged periods. A number of devices have been designed to accomplish this prolonged exposure. Each of these devices, however, have had serious disadvantages. Many of them clog easily and require valuable time to free them of the trash and litter caught therein. This results in a considerable amount of the trash and litter being left covered over by a certain amount of the earth and thereby providing a protective habitat for insects such as those indicated above. Other devices have proved ineffective in getting the soil to sift through the refuse so as to leave the latter on the surface of the ground. All of these devices have been unsatisfactory in that the weeds tend to entwine themselves about the device and thereby cause it to clog. None of them provide a positive means for causing the soil to separate from the weeds, etc. My invention is directed to overcoming these disadvantages to provide a very effective weed, debris and litter surfacing device.

An object of my invention is to provide a novel and improved weed, debris and litter surfacing device for ground working implements which will operate with a high efficiency to deposit the weeds, debris and litter upon the surface of the ground without any appreciable amount of earth intermingled therewith.

Another object is to provide a new and improved weed, debris and litter surfacing device for ground working implements which will provide positive means for causing the intermingled earth to sift downwardly through the weeds, debris and litter and for depositing the residue upon the surface of the earth.

Another object is to provide a weed, debris and litter surfacing device which will automatically prevent itself from clogging and which will permit free turning of the implement to which the device is attached.

Another object is to provide a weed, debris and litter surfacing device which will preclude the entwinement of weeds, etc., thereabout.

A further object is to provide a weed, debris and litter surfacing device for ground working implements which is light in weight and simple and cheap to manufacture, assemble, and operate.

These and other objects and advantages of my invention will more fully appear from the following description made in connection with the accompanying drawings, wherein like reference characters refer to similar parts throughout the several views, and in which:

Fig. 1 is a side elevational view of a ground working implement showing one embodiment of my invention attached thereto;

Fig. 2 is a top plan view of a winged shovel of a ground working implement having several embodiments of my invention attached thereto;

Fig. 3 is a vertical sectional view taken along line 3—3 of Fig. 2 with a shank member added thereto;

Fig. 4 is a fragmentary perspective view of one embodiment of my invention and a mounting therefor for securing the same to the center of a shovel of the type shown in Fig. 2;

Fig. 5 is a top plan view of the mounting for one of the flexible members adapted to secure the same to the right side of a winged shovel;

Fig. 6 is a top plan view of a mounting for one of the flexible members adapted for attachment to the left side of a winged shovel;

Fig. 7 is a perspective view of the mounting shown in Fig. 5;

Fig. 8 is a fragmentary vertical sectional view through one embodiment of my invention and its mounting attached to the upper portion of the winged shovel.

One embodiment of my invention as shown in Figs. 1–8 includes an elongated flexible member 10 which has a resilient forward portion 11. As shown, the elongated flexible member 10 is comprised of a hollow section of rubber hose, and the forward portion 11 thereof carries within itself a helical spring member 12. The elongated flexible member 10 is mounted by its forward portion 11 upon the upper rear edge 13 of a ground working implement 14. As shown, the ground working implement 14 is a winged shovel which is carried upon a shank 15 of an entire ground working device (not shown). The flexible members 10 are attached to the rear edge 13 of the ground working implement 14 by means of variously shaped mountings best shown in Figs. 4, 5, and 6. Fig. 4 shows a mounting indicated generally as C which is adapted to carry one of the flexible members 10 and secure it to the central upstanding portion 14a of the winged shovel 14. This central mounting C consists of a hollow tubular member 16 which has a forwardly and upwardly extending flange 17 secured to its bottom portion. This flange 17 is provided with an aperture 18. The flexible member 10 is secured within the tubular member 16 by a rivet 19, which extends through the flexible member 10. Welded to the upper outer surface of the tubular member 16 or secured in some other suitable manner thereto is a strap member 20 which is provided with a longitudinally extending slot 21 and which extends first upwardly and then rearwardly.

Fig. 5 shows a mounting for one of the flexible members 10 adapted to secure the flexible member to the right hand side of the shovel 14. This mounting is indicated generally as R, and is comprised of a tubular member 22 which has its forward portion 23 flattened along a diagonal line to provide an abutment shoulder 24. The flattened portion 23 is provided with a pair of apertures 25 for attaching the same to the upper rear edge 13 of the winged shovel 14.

Fig. 6 shows a mounting indicated generally as L which is comprised of a tubular member 26 and which has its forward portion 27 flattened along a diagonal line to provide an abutment shoulder 28. This flattened portion 27 is provided with a pair of apertures 29 for attaching the same to the upper rear edge 13 of the left hand side of the winged shovel 14. A washer 30 or a plurality thereof may be utilized between the flattened portions 23 and 27 and the upper edge 13 to adjust the extent to which the forward portions 11 extend upwardly.

In operation, a plurality of the elongated flexible members 10 are connected by bolts, rivets or other suitable means to the upper rear edge 13 of the ground working implement 14, in position to receive thereover the intermingled weeds, debris, litter and earth, which are caused to be deposited thereon by the shovel 14 as it works the ground. This is best shown in Figs. 1 and 2. The mountings C, R, and L are secured in their respective places by a plurality of rivets or bolts provided therefor in the conventional manner. When they are properly mounted the elongated flexible members 10 extend rearwardly in a straight line longitudinal direction relative to the movement of the ground working implement 14. The resilient spring member 12 provides a certain amount of rigidity to the forward portion 11 of the flexible member 10 and also provides therefor a substantial amount of resiliency. Due to the conventional angularity of the upper rearward edge 13 of the winged plow 14 the various mountings C, R, and L carry the forward portions 11 of the elongated flexible members 10 in an upwardly extending position, as is best shown in Figs. 1 and 3. The rearward portions of the flexible members 10 will, of course, assume a more horizontal position than the forward portions 11 because of the resiliency provided by the spring member 12 within the forward portion 11. As the intermingled weeds, debris, litter and earth are as deposited upon the upper surfaces of the elongated flexible members 10 the resilient forward portions 11 will come in contact with this material first. These resilient portions 11 tend to maintain this deposited material in a slightly elevated position above the surface of the ground. This tendency is dependent upon the strength of the spring 12 as compared to the weight of the deposited material. Ordinarily, the spring 12 is amply sufficient to maintain the deposited residue in a slightly elevated position. Since the weight of the deposited material varies, the forward portions 11 impart an upward and downward movement to the deposited material. This upward and downward movement provides an agitation for the weeds, debris, litter and earth, causing the latter to sift downwardly through the refuse and leaving the refuse to slide off the rearward portion of the elongated flexible members 11 and to be deposited upon the surface of the ground where it will lie for prolonged periods exposed to the sunlight. Such exposure as pointed out above is substantially beneficial to the farmer in that it effectively controls insects and at the same time leaves lumps of earth exposed to the various elements for rapid decomposition.

The resilient nature of the forward portions 11 of the flexible members 10 is extremely important in insuring that the device will not clog. it is obvious that as the weight of the intermingled earth and crop residue is increased the forward portion 11 will yield downwardly causing the deposited material to engage the earth's surface and be dragged rearwardly free of the flexible members 10. Thus, an automatic declogging feature is provided which will insure the operator that it will not be necessary for him to dismount from his implement propelling vehicle to remove large amounts of intermingled debris and earth. At the same time it obviates the possibility of having huge piles of intermingled crop residue and earth being deposited in one place in the field. This is important since such deposits almost invariably provide a favorable habitat for hibernating insect larvae.

The flexible nature of the elongated members 10 permits the operator of the ground working implement to turn a sharp corner without danger of injuring the trailing members 10. Previously such members have always been formed of rigid materials, said materials making it impractical for the operator to make short turns for fear of permanently injuring the trailing member.

It should be noted that the diameter of the flexible members 10 is relatively large as compared to the diameter of the weeds and crop residue portions which are to be surfaced thereby. This is a very important feature since it tends to preclude the entwinement of such materials around the flexible members 10. Devices of this type previously known have been of a relatively small diameter with the result that the material deposited thereupon would tend to entwine around the rearwardly extending members and cause the same to become clogged with a large amount of such material intermingled with earth. Another feature of my device is that the spring member 12 maintains the flexible members 10 in aligned position and extending directly rearward. These springs will yield laterally as well as vertically. The extent to which these forward portions of these flexible members 10 are elevated can be varied by the insertion or removal of a number of the washers between the flattened portions 23 or 27 and the upper edge 13 of the ground working implement 14.

It should also be noted that my weed, debris and litter surfacing device is very light in weight and extremely simple and cheap to manufacture, assemble and operate. The materials required for the construction of this device are inexpensive and the parts thereof are extremely simple. In addition, it provides a refuse surfacing device which is substantially 100% efficient in operation. It has retained the desirable features of such devices and eliminated the disadvantages of the same which were previously known.

It will, of course, be understood that various changes may be made in the form, details, arrangement and proportions of the various parts without departing from the scope of my invention.

What I claim is:

1. A ground working implement of the type having a ground working shovel, said shovel including at least one elongated flexible member extending rearwardly from said ground working shovel in position to receive thereover the earth material after it has been worked by said ground working shovel, and a helical spring member mounted within the forward portion of said flexible member and resiliently urging said forward portion upwardly to impart thereto normal upward and downward movement as varying weights of the intermingled weeds, debris, litter, and earth material are received upon said forward portion whereby said earth material as it passes thereover is caused to separate from the weeds, debris and litter intermingled therewith and the weeds, debris and litter are caused to be deposited upon the surface of the ground.

2. A weed, debris, and litter surfacing attachment for ground working implements comprising an elongated flexible member adapted to be secured to said implements to extend rearwardly therefrom in position to receive thereover the intermingled weeds, debris, litter and ground after the latter has been worked by said implements and a resilient but readily yieldable helical spring member extending longitudinally through only the forward portion of said flexible member and urging said forward portion upwardly to provide normal upward and downward movement of said forward portion in accordance with the weight of the material received thereupon whereby the earth intermingled with said weeds, debris, and litter will be agitated by the normal upward and downward movement of said forward portion and will be caused to be separated from said weeds, debris, and litter whereby said weeds, debris, and litter will be caused to be deposited upon the surface of the ground.

3. A weed, debris, and litter surfacing attachment for ground working implements comprising a hollow elongated flexible member adapted to be secured to said implements to extend rearwardly therefrom in position to receive thereover the intermingled weeds, debris, litter, and ground after it has been worked by said implement and a helical spring member carried within the forward portion of said flexible member and resiliently urging said forward portion upwardly to impart thereto normal upward and downward movement as varying weights of the intermingled weeds, debris, litter, and earth are received upon said forward portion whereby said weeds, debris, litter and earth will be agitated and the earth will be caused to sift downwardly through said weeds, debris, and litter and the weeds, debris, and litter will be caused to be deposited upon the surface of the ground.

4. A weed, debris and litter surfacing attachment for ground working implements comprising an elongated flexible member adapted to be secured to said implement to extend rearwardly therefrom in position to receive thereover the intermingled debris, litter and ground after the latter has been worked by said implements, and coiled spring means mounted within the forward portion of said flexible member and resiliently urging said forward portion upwardly to impart thereto normal upward and downward movement as varying weights of intermingled weeds, debris, litter and earth material are received upon said forward portion whereby said earth material as it passes thereover is caused to separate from the weeds, debris and litter intermingled therewith and the weeds, debris and litter is caused to be deposited upon the surface of the ground.

References Cited in the file of this patent

UNITED STATES PATENTS

| Number | Name | Date |
| --- | --- | --- |
| 870,320 | Schimanoski | Nov. 5, 1907 |
| 1,427,145 | Yantz | Aug. 29, 1922 |
| 1,598,724 | Horton | Sept. 7, 1926 |
| 1,870,850 | Horton | Aug. 9, 1932 |